INVENTOR.
A. P. Sorber
by Le Roy J. Leishman
AGENT

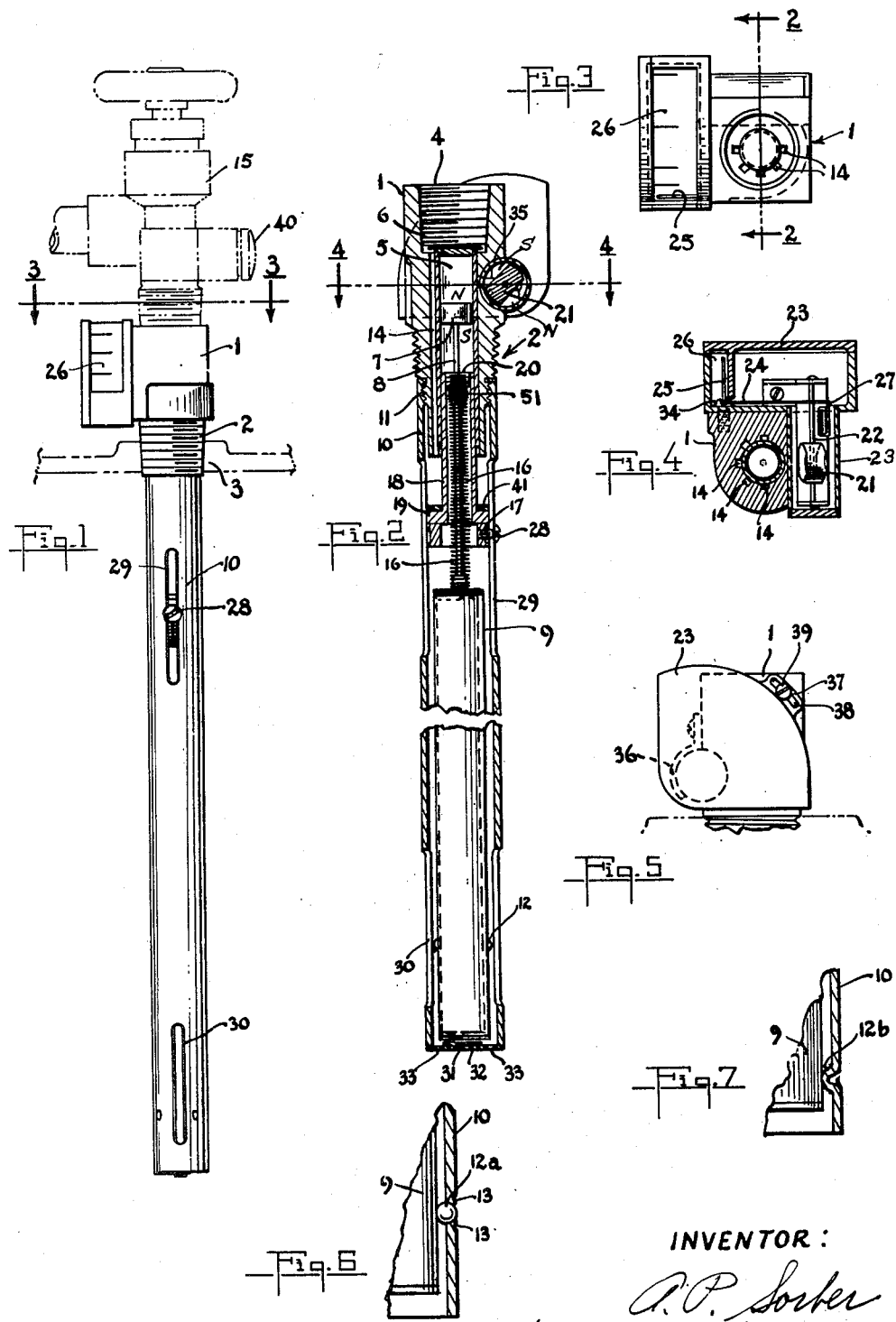

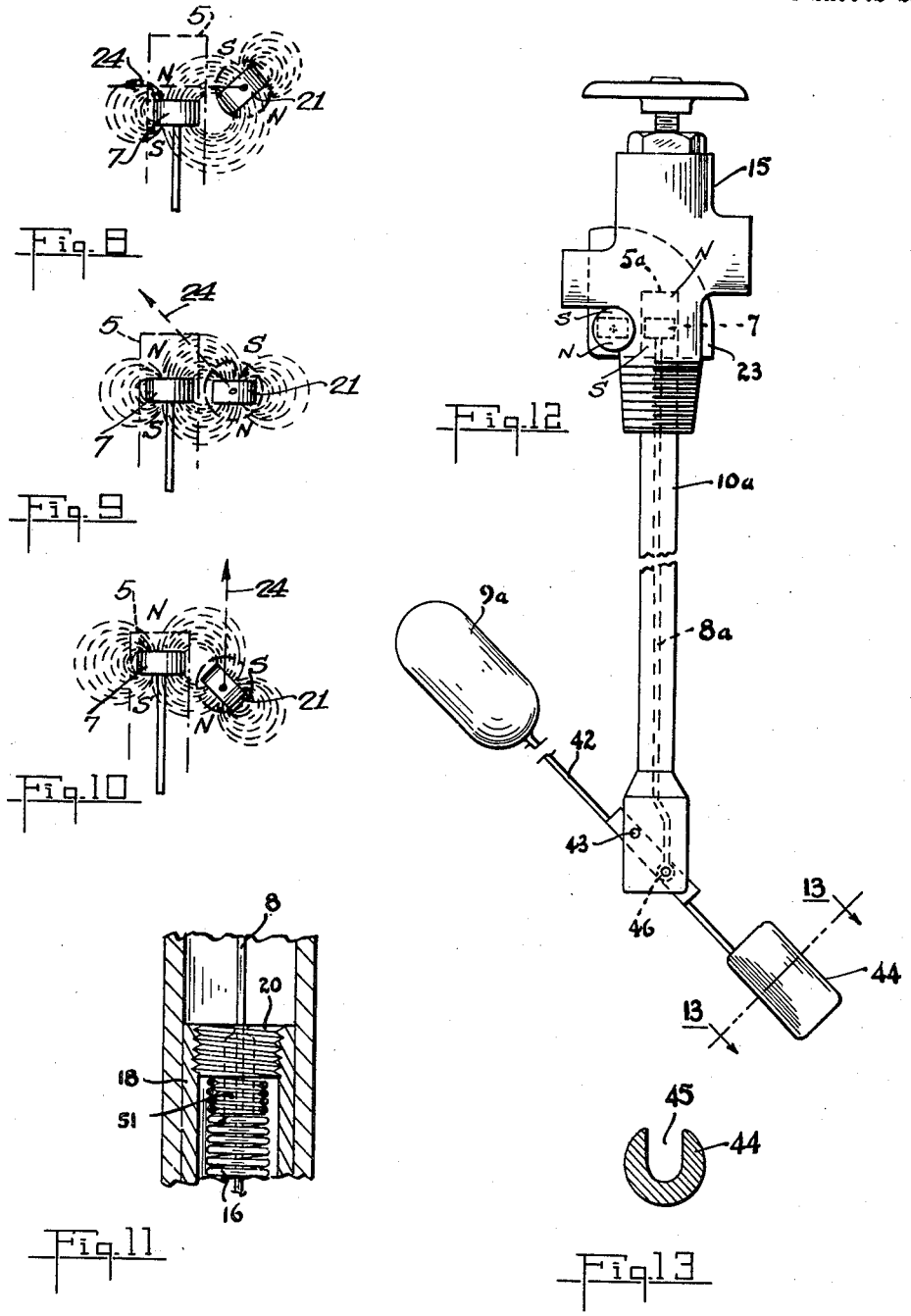

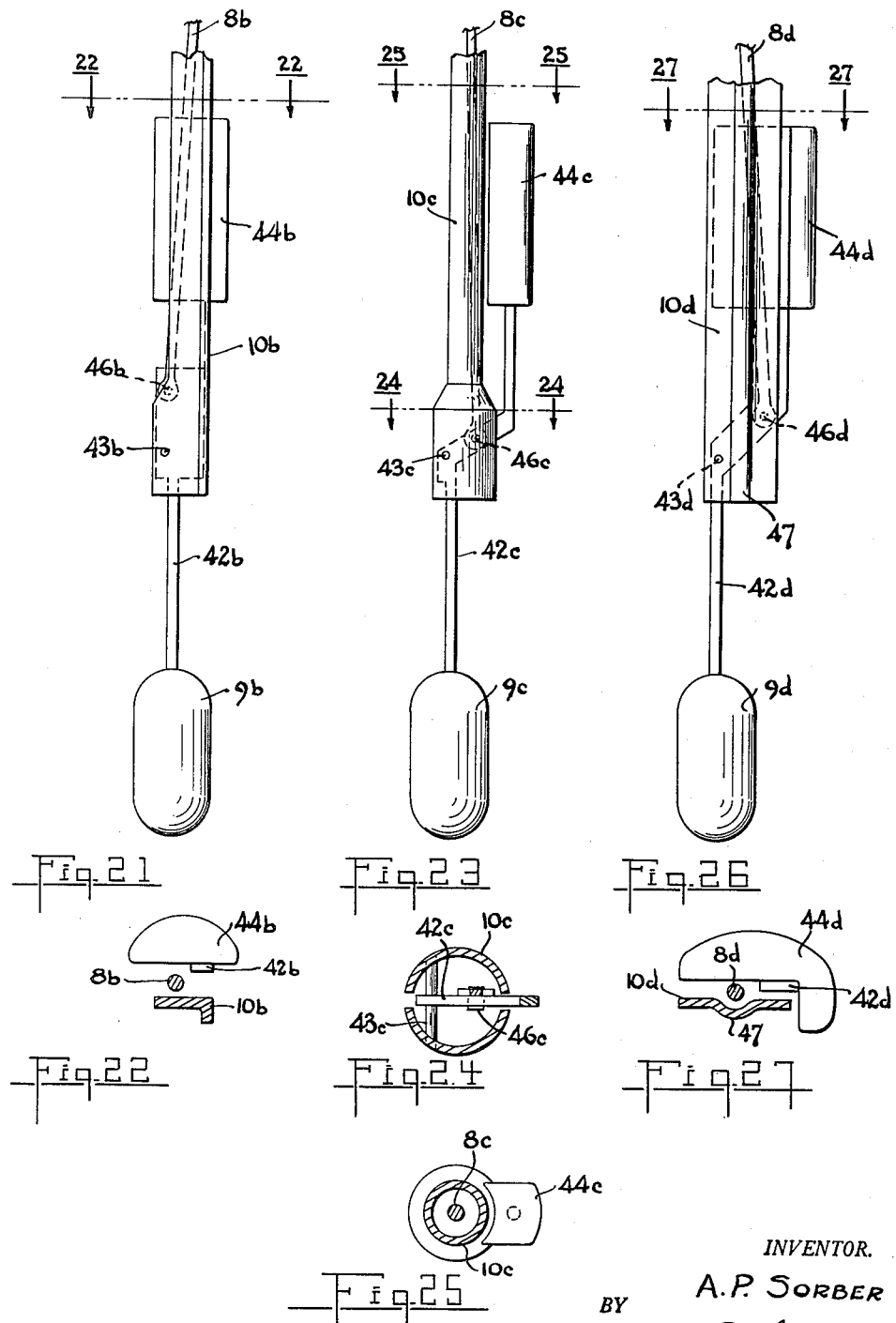

United States Patent Office 2,697,350
Patented Dec. 21, 1954

2,697,350

LIQUID LEVEL GAUGE

A. P. Sorber, Los Angeles, Calif.; Gordon Paul Sorber, administrator of said A. P. Sorber, deceased Application February 25, 1953, Serial No. 338,820

5 Claims. (Cl. 73—317)

This application is a continuation in part of my application Serial No. 781,822, filed October 24, 1947, now Patent No. 2,634,608.

The invention herein disclosed relates to gauges, and more particularly to gauges for indicating the quantity of liquid within a tank or reservoir.

Devices embodying my invention are particularly adaptable for installation in tanks not initially supplied with gauges, such as the butane tanks with which many trailers and small homes are at the present time equipped.

One of the objects of my invention is to provide a gauge that may readily be interposed between the filling valve and its fitting merely by removing the valve, screwing the gauge into the opening from which the valve has been taken, and then threading the valve into the top of the gauge device.

Another object of my invention is to provide a liquid level gauge in combination with the usual valve assembly to control the inflow of liquid and the outflow of gas.

A further object is to provide a gauge in which the parts that are to be disposed in the tank are so arranged and proportioned that they may be inserted through the female opening provided in the filling valve in a tank not originally equipped with a gauge.

Another object is the provision of a structure in which the scale and indicating hand may be positioned entirely outside the tank.

An additional object is to provide a design that is simple, inexpensive and durable.

Still other objects will be apparent throughout the specification.

In the drawings:

Fig. 1 is a front elevation of my device showing the top of the tank and the valve in broken lines.

Fig. 2 is the side elevation, partly broken away, of the embodiment shown in Fig. 1.

Fig. 3 is a plan view taken along line 3—3 of Fig. 1.

Fig. 4 is a section taken along line 4—4 of Fig. 2.

Fig. 5 is a side view of the top portion of my device showing the means for adjusting the dial housing for certain compensation purposes hereinafter explained.

Fig. 6 is a detailed view, partly in section, showing the use of a ball for reducing friction between my longitudinal float and the guide tube in which it is enclosed.

Fig. 7 is a view similar to that of Fig. 6, but showing an embossed portion adapted to be engaged by the float in order to reduce friction between the guide and said float.

Figs. 8, 9 and 10 show the magnetic fields about the magnetic elements in my device whereby longitudinal movement is converted into angular movement without physical engagement between the rectilinearly and angularly movable systems.

Fig. 11 is an enlarged view of certain of the parts shown in Fig. 2, showing how the spring that partially supports the float in the device of Fig. 1 is attached at the top.

Fig. 12 shows the novel features of the invention that is the subject of this divisional application.

Fig. 13 is a cross section taken along line 13—13 of Fig. 12.

Fig. 21 is a view of a modification of the lower part of my valve structure in which the weight which counterbalances the float may, for purposes of installation, be positioned at one side of the downwardly extending arm that supports the lever assembly.

Fig. 22 is a section taken on line 22—22 of Fig. 21.

Fig. 23 is a view similar to that of Fig. 21, showing still another modification of the counterbalancing and supporting structure.

Fig. 24 is a section taken along line 24—24 of Fig. 23.

Fig. 25 is a section taken on line 25—25 of Fig. 23.

Fig. 26 is similar to Figs. 21 and 23, but illustrates still another modification in the counterbalancing structure.

Fig. 27 is a section taken on line 27—27 of Fig. 25.

Figure 14:
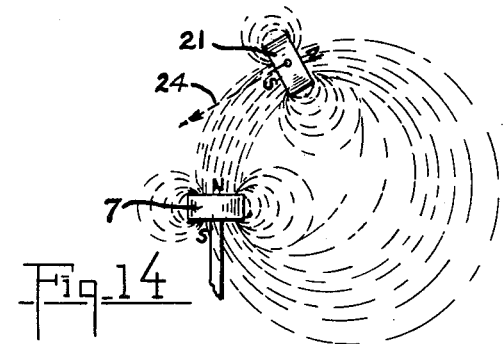
Figs. 14 to 18 are similar to Figs. 8, 9 and 10, and illustrate the wide angle of rotation of the rotatable magnetic element that is possible in my device in response to the rectilinear movement of the other magnetic element.
Figure 15:
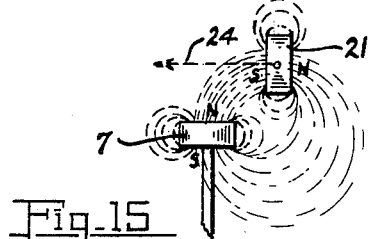

My invention will perhaps best be understood if the device of Figs. 1 to 7, shown also in the application of which this is a division, is first described. The apparatus is assembled generally around a member 1 having a threaded lower end 2 adapted to be screwed into the threaded hole 3 (Fig. 1) in the top of the tank into which the customary valve assembly is generally threaded. Member 1 has an internally threaded upper end 4 adapted to receive the male-threaded end of the valve assembly that is normally placed in the opening 3 in tanks not initially equipped with a gauge. It will thus be clear that the upper portion 1 of my gauge is interposed between the usual valve assembly and the socket into which such assembly is conventionally mounted.

Member 1 has a central recess or cavity 5 extending upwardly from the lower end of member 1. This recess has a closed upper end. Such a closed upper end may be effected merely by providing a recess that is not sufficiently long to extend into the upper threaded portion 4, or else the recess may extend all the way through from the lower portion of member 1 to the threaded section 4 and the top end of the recess 5 closed by means of a cap 6 such as that illustrated in Fig. 2.

Magnetic element 7, preferably constructed of Alnico or other similar magnetic material, is arranged in recess 5 for rectilinear movement therein. Element 7 is connected by means of a rod 8 to an elongated cylindrical float 9, which moves within a tubular casing 10 threadedly attached to a threaded reduced portion 11 of member 1.

In order to reduce friction between float 9 and the inner walls of the guide tube 10, this tube is provided with rounded bearing portions 12 as illustrated generally in Figs. 2, 6 and 7. Two forms of these are illustrated. In Fig. 6 a ball 12a is shown nesting in a cup, which consists of a hole having peened-over edges 13. In Fig. 7 another arrangement is illustrated for serving the same general purpose. In this modification an embossed nodule is shown pressed in the side of the tube. These rounded points 12 serve as guides or ways for the float 9.

When the tank is being filled, it is desirable to keep the inflowing liquid from entering the recess 5. Accordingly, a separate channel or channels may be provided between the upper socket 4 and the lower end of member 1. In practice I use a plurality of ducts, one of which, 14, may be seen in Fig. 2. The upper end of these ducts may be seen in Fig. 3 and they also appear in Fig. 4 in which the cross-sectional view cuts through them. Not only does the inflowing liquid pass through these channels 14, but the gas from the tank also passes upward through them to the appropriate valve in the valve assembly 15, shown in dotted lines in Fig. 1.

Part of the weight of the float 9 is carried by a spring 16 threadedly attached to a boss provided on the upper end of the float. The upper end of this spring is attached to the top portion of a sleeve 18 supported by a ring 17 which may be initially adjusted to any longitudinal position within the tube 10. The sleeve 18 is provided with a flange 19 at its lower end. This flange normally rests on the top surface of ring 17. Sleeve 18, of course, surrounds spring 16 which in turn surrounds the rod 8. In order to provide means for attaching the upper end of spring 16 at the upper end of sleeve 18, a threaded member 20 is threaded into appropriate threads in the top end of sleeve 18. Member 20 has a reduced portion 51 which is threaded to receive the spring 16 as shown in Figs. 2 and 11. In addition to supporting spring 16, sleeve 18 has other functions which will hereinafter be described.

The device hereinbefore described may be adapted to measuring the height of liquids of different specific gravity merely by selecting a spring of the proper tension to carry an appropriate portion of the weight of the float.

In order to prevent the unnecessary escape of gas through the device, it is desirable that no outside opening be provided through member 1 other than that afforded by the socket 4. I therefore transmit motion from the float 9, rod 8 and element 7 attached thereto by magnetic means acting through the wall member 1. This member, or at least the said wall thereof, must accordingly be formed of non-magnetic material. The transmission of motion through this wall is effected by an assembly shown in cross section in Fig. 4. A rotatable magnetic element 21 is mounted on a shaft 22 journaled by appropriate means within a housing 23. An indicator 24, formed of a strip of metal, is bent as shown in Fig. 4. The free end 25 is arranged at right angles to the main arm of member 24 to act as an indicating hand sweeping over the calibrated scale 26. The opposite end of member 24 may be rolled over as shown at 27 in Fig. 4 to act as a counterbalance. The rotation of magnetic element 21 thus causes the hand 25 to move across the calibrated scale 26.

In order to provide an adequate angle of rotation for magnetic element 21, it is pivoted intermediate its North and South poles substantially as indicated in Figs. 2, 8, and 10, and in Figs. 14 to 17; and magnetic element 7 is mounted so that its poles are disposed approximately in alignment with the rod 8. The distance between the poles of these elements should not be materially greater than the diameter of the said elements if the maximum angular rotation of element 21 is to be achieved for a given linear movement of element 7. If the magnetic elements are not cylindrical in shape, or are irregular in cross section, then the average distance through any magnetic element in a direction transverse to its magnetic axis should not be materially less than the distance between its magnetic poles.

In Fig. 2, the rectilinearly movable magnetic element 7 is shown at substantially the position illustrated in Fig. 8. When element 7 is in this position relative to element 21, the magnetic lines of force are such that element 21 will be disposed in substantially the angular position shown in Figs. 2 and 8. As member 7 moves upward, the lines of force will cause element 21 to rotate to the angular position illustrated in Fig. 9. When element 7 is located above element 21 in substantially the position shown in Fig. 10, element 21 will occupy the position which Fig. 10 illustrates. The position of the indicating hand is indicated generally in broken lines in Figs. 8, 9 and 10.

The relative positions of the magnetic elements shown in Figs. 8, 9, and 10 are the exact positions for 90 degrees of pointer rotation that these elements occupy when the device is constructed as shown in Figs. 1 to 5. The relatively great angular movement of member 21 for the short rectilinear movement of element 7 is in large part due to the contour of these magnetic elements, as hereinbefore set forth. The relatively short distance between the poles of these magnetic elements as compared to their width or diameter results in magnetic fields that are not materially distorted from their natural circular shape and contributes greatly to the large angular movement. The shape of the magnetic fields and the direction of the magnetic lines shown in these figures is not theoretical but has been determined by accurately plotting the field strength and its pattern.

The use of magnetic elements disposed as shown in the drawings and having substantially the shape indicated, is capable of producing much greater angular movement of element 21 in response to the rectilinear movement of element 7 than has been shown in Figs. 8 to 10. This angular movement may be as much as 270 degrees and it is very stable over approximately 240 degrees. The useful angular rotation that rotatable element 21 may be given in response to rectilinear movement of element 7 is shown in Figs. 14 to 18.

Figure 16:
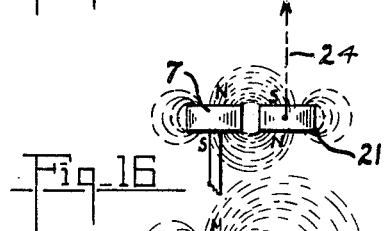
Figure 17:
Figure 18:
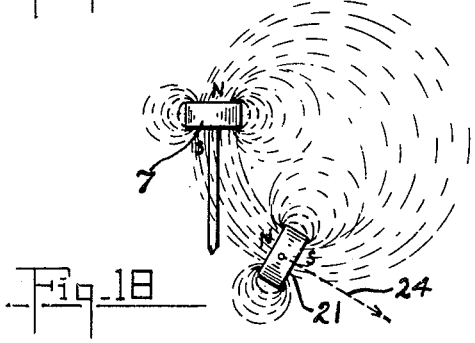
Figure 19:
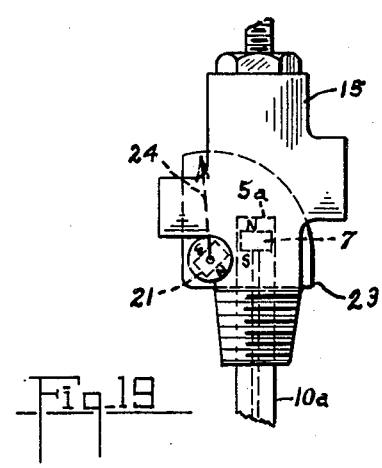
Fig. 19 shows a portion of the assembly shown in Fig. 12 but the magnetic elements are in the position shown in Fig. 10.
Figure 20:
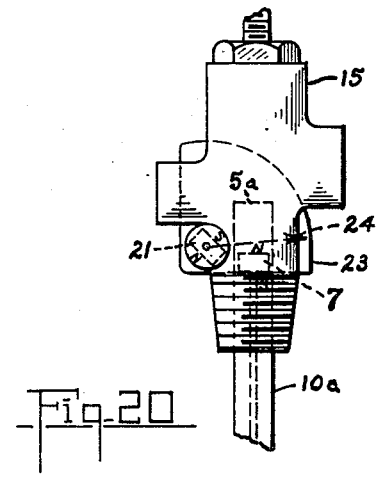
Fig. 20 is another view similar to Fig. 19 but the magnetic elements are in the position shown in Fig. 8.

It will be noted in Figs. 9 and 16 that when the rotational axis of element 21 is in a plane that passes through the center of the rectilinearly movable element and that is perpendicular to the path of motion of the rectilinearly movable member that the magnetic axes of these two elements are substantially parallel.

A bumper or rest for the float 9 is provided at the bottom of tube 10. This comprises a disc 31 suitably attached to the bottom end of the tube. A resilient washer 32 is appropriately attached to the center portion of disc 31. This washer should be made of material that is insoluble in the liquid to be placed in the tank. When this liquid is butane, a Neoprene washer is satisfactory. A series of holes 33 is circularly arranged around disc 31 between the bumper 32 and the walls of tube 10, to permit the ready flow of liquid in or out of the tube.

To permit the easy flow of liquid through tube 10 it is provided with a plurality of slots 29 and 30.

Regardless of the tension that may be required in the spring 16 for a given fluid, it is necessary that the float 9 be capable of reaching the bottom of its longitudinal stroke when the tank is empty. In order to bring this about, a compensating adjustment for the tension of the spring is provided for. Such compensation is effected by means of the ring 17 and screw 28, which passes through slot 29 in tube 10 and is threaded into member 17. Inasmuch as the sleeve 18, from the upper end of which spring 16 is suspended, rests upon ring 17 it can readily be understood that the adjustment of member 17 up or down the tube will cause the tension on spring 16 to increase or decrease. Accordingly, ring 17 is adjusted at the factory to a longitudinal position within the tube that will cause float 9 to come as close as possible to the bumper 31 without actually touching it. Set screw 28 is then tightened to secure ring 17 in such adjusted position.

As the tank is filled, it will be seen that magnetic element 7 will rise or fall with the float 9 and that this motion will be transmitted magnetically to the element 21, from which the motion is carried to the indicating hand 25 so that this hand will at all times indicate the level of the liquid within the tank.

It will be observed that the housing for the scale, indicator, and rotatable magnetic element, consist, in the embodiment shown, of the cylindrical portion surrounding the magnetic element 21 and a larger arcuate portion for the dial and the indicating hand. This housing may be attached to member 1 by a single screw 34 shown in Fig. 4. The tubular portion of the housing fits into a semi-circular recess 35 in the side of member 1 as shown in Fig. 2. This arrangement prevents any angular movement of the housing, and screw 34 consequently serves only to hold the housing 23 against member 1 and to prevent the housing from rotating around the tubular portion of the housing containing element 21.

If the tank is formed of ferrous material such material will distort the magnetic field surrounding the magnetic element, resulting in a false reading that must be compensated for. The calibration is also affected by the distance that member 1 is screwed down into the opening 3 in the tank. Means of compensation for such variations are shown in Fig. 5, in which a clamp 36 is shown for rotatably mounting the housing 23 on member 1. This housing is provided with a short flange 37 having a slot 38. A clamping screw 39 passes through slot 38 and is threaded into member 1. When screw 39 is loosened, the housing 31, supporting the scale, may be angularly adjusted to bring the reading to zero regardless of the effect of the ferrous metal of the tank upon the previously described magnetic elements.

If the tank is filled with a fluid such as butane, which produces a gas, it is desirable that none of the gas escape unless the pressure within the tank reaches a dangerous point. To prevent the building up of excessive pressures, the usual valve combination 15 through which the tank is filled and through which the gas passes for use, is normally provided with some sort of pop-off valve 40 which is not here described in detail because it forms no part of this invention. Should leakage develop in the valve assembly 15, or should such valve or the external parts of my gauge be broken off, it is desirable that means be provided to prevent the too rapid flow of gas from the tank. This is taken care of by the sleeve and flange arrangement 18—19 shown in Fig. 2. A resilient washer 41 rests on the upper surface of the flange 19 of member 18. Excessive flow of gas from the tank will cause flange 19 to be pushed upwardly until washer 41 comes in contact with the lower end of the ducts 14, through which the gas passes.

A complete shut off is prevented by employing a washer with an uneven upper surface, or by recessing the mouth of at least one of the orifices 14, or by providing a small bypass into at least one of the orifices. When no such excessive flow is present, the weight of sleeve 18 and the float structure suspended therefrom is sufficient to cause the flange 19 of sleeve 18 to rest upon the ring 17.

In the structure just described it will be observed that the dimensions of the reduced end of member 1 and the tube 10 are such that the entire structure attached to the lower end of member 1 may be inserted into the tank through the opening provided for the ordinary valve assembly. It is thus possible readily to install this gauge device in tanks normally provided only with the usual valve structure.

The novel features of the device hereinbefore described are claimed in my co-pending application Ser. No. 781,822, of which the present application is a division. Figs. 12 and 13 illustrate departures from the previously described structure, and it is to these departures that the claims of the present application are directed.

In the device of Fig. 12, a member 10a is inserted into the lower end of the recess 5a that is provided for the rectilinearly movable magnetic element 7. Member 10a need not necessarily be tubular, as its function is merely to support a lever system at its lower end. Moreover, it is not essential that member 10a be supported by insertion within the recess 52. It may be attached in any other appropriate way, or it may be integral with the upper structure 15. Lever 42 is shown pivoted to member 10a at point 43. This lever carries a float 9a and a counterbalance 44. A rod 8a operatively connects element 7 to lever 42 at a point 46 which is displaced from the pivot 43 by an amount sufficient to give the magnetic element 7 the required longitudinal movement for a given arcuate rise or fall of the float 9a. To permit this structure to be inserted into the tank, the counterbalance 44 may be of the horseshoe shape illustrated in Fig. 13. With this arrangement, the float 9a may be turned down into alignment with the tube 10a, in which position this tube will fit into the recess 45 in the counterbalance 44. When so arranged the system that is to be disposed within the tank may be inserted through the opening provided therein; and as soon as the lever assembly reaches the interior of the tank, the float, lever and counterbalance will assume an angular position determined by the height of the liquid therein.

It will be noted that the pivot 43 of the lever 42 and the pivot 46 of the rod 8a are located on opposite sides of the longitudinal axis of member 10a. Such location avoids the necessity of either of these pivots being very far from such longitudinal axis, and the lower end of member 10a thus has a more symmetrical shape than would otherwise be the case and it is consequently easier to insert in the opening in the tank to which the gauge structure is attached. Inasmuch as the pivot 46 is thus not in alignment with the main body of rod 8a, this rod must be offset or kinked to permit the magnetic element 7 to move along the longitudinal axis of the recess 7 and thus remain symmetrically disposed therein.

This liquid indicator may be constructed as a unitary assembly with the upper valve structure, as shown in Fig. 12, or the valve may be omitted and the indicator provided with an upper portion like that shown in Fig. 2, where member 1 is internally threaded to receive a separate valve such as that indicated in broken lines in Fig. 1.

It is of course possible to use my device as a guage entirely disassociated from a valve. In this case, it is not necessary to provide a top opening such as that shown at 4 in member 1 of Fig. 2, and the ducts 14 may likewise be omitted.

The structures of Figs. 12 and 13 make it possible for the lever assembly to be disposed in general alignment with the lower depending portion 10a of the valve assembly so that the entire sub-structure consisting of the depending arm 10a, the lever 42, the float 9a, and the counterbalance 44 may be inserted through the opening in the tank in which the super-structure 15 is threadedly mounted, and the counterbalance 44 is shaped so that it will straddle the depending arm 10a. The modification shown in Figs. 21 to 27, inclusive, are alternative arrangements that serve this same end.

It has already been explained that the depending portion 10a of Fig. 12 may be tubular or solid. The structure shown in Fig. 21 is particularly adapted for use when the depending portion is solid. This figure shows the parts arranged in general longitudinal alignment to permit them to pass through the opening in the top of the tank. It will be noted that in this modification the counterbalance 44b has been turned to a position in which it is behind the arm 10b as here viewed, and that the arm has a flange on one side to strengthen it. It will be obvious that this modification accomplishes much the same purpose as the arrangement previously described in connection with Figs. 12 and 13.

In the form shown in Fig. 23, the depending portion 10c is tubular but the sides are slotted at the bottom as shown in Fig. 24 to permit the free movement of lever 42c; and the slot on the right side of tube 10c extends far enough upwards to permit the portion of lever 42c adjoining the counterbalance 44c to extend therefrom. In this arrangement, it will be noted that the counterbalance 44c lies close to the right edge of tube 10c, permitting the lever structure and the supporting tube to be inserted through a relatively small opening.

In the modification shown in Figs. 26 and 27, the arm 10d corresponding to the depending portions 10a, 10b, and 10c of the previously described figures, has a central rib 47 to strengthen it. In this form, the counterbalance lies partially behind arm 10d and partially at one side, as clearly shown in Fig. 27.

My preferred embodiment of the pivotally mounted float and counterbalance structure is that shown in Figs. 12 and 13, but it will be clear to those skilled in the art that the modifications shown in Figs. 21 to 27 are alternative embodiments serving the same general ends.

It will also be apparent to those skilled in the art that many other modifications may be made, and that mechanical equivalents may be substituted to perform the respective functions of the various elements of the structures shown—all without departing from the broad spirit of my invention as succinctly set forth in the appended claims.

My claims are:

1. A liquid gauge including: a structure having a reduced and elongated lower portion for insertion through an opening in a liquid receptacle; a lever pivoted to said elongated lower portion; a float attached to one end of said lever; a counterbalance attached to the other end of said lever, said counterbalance recessed so that in certain angular positions of said lever the counterbalance may partially surround said elongated lower portion so that said lever, said float, said counterbalance and said elongated lower portion may all be inserted through said opening for installation purposes; a calibrated scale; an indicator cooperating with said scale; and means for producing relative movement between said scale and indicator in response to the movement of said float.

2. A liquid level gauge including: a structure formed to permit a part thereof to extend through an opening in a liquid receptacle, said structure comprising a first portion having a cavity extending inwardly from the lower end thereof and a second portion depending from said lower end; a lever carried by and pivoted near the free end of said second portion; a float attached to one end of said lever; a counterbalance attached to the other end of said lever, said counterbalance recessed so that in certain angular positions of said lever the counterbalance may partially surround said second portion so that said lever, said counterbalance and said second portion may all be inserted through said opening; a first magnetic element mounted for rectilinear movement within said cavity in response to the movement of said float; a second magnetic element supported on said first portion for rotation in response to the movement of said first magnetic element; a calibrated scale; an indicator cooperating with said scale; and means for producing relative movement between said indicator and scale in response to the movement of said second element.

3. A liquid level gauge including: a structure having a reduced and elongated lower portion for insertion through an opening in a liquid receptacle; a lever pivoted to said lower elongated portion; a float attached to one end of said lever; a counterbalance attached to the other end of said lever, said counterbalance recessed so that in certain angular positions of said lever the counterbalance may partially surround said lower elongated portion so that said lever, said float, said counterbalance and said lower elongated portion may all be inserted through said opening for installation purposes; a calibrated scale; an indicator cooperating with said scale; and means for producing relative movement between said scale and indicator in response to the movement of said float, said means comprising an operating rod therefor, said rod being pivoted to said lever; the pivot of said lever and the pivot of said rod being located on opposite sides of the longitudinal axis of said elongated portion in order to enhance the symmetry of said portion with respect to said longitudinal axis to facilitate the insertion of said portion through said opening.

4. In a liquid level guage, a combination including: a structure having a reduced lower end for insertion through an opening in a liquid receptacle, said structure comprising a first portion having an elongated cavity therein axially aligned with the longitudinal axis of said portion and extending inwardly from the lower end thereof, and a second portion depending from the lower end of said first portion; a lever carried by and pivoted near the free end of said second portion; a float attached to one end of said lever; a counterbalance attached to the other end of said lever, said counterbalance recessed so that in certain angular positions of said lever the counterbalance may partially surround said second portion so that said lever, said float, said counterbalance and said second portion may all be inserted through said opening; a first magnetic element mounted for rectilinear movement within said cavity along the longitudinal axis of said cavity; a rod having one end attached to said first magnetic element and its other end picoted to said lever, said rod acting to move said first magnetic element longitudinally within said cavity in response to the movement of said float; the pivot of said lever and the pivot of said rod being located on opposite sides of the longitudinal axis of said second portion to enhance the symmetry of the combination and thus facilitate the insertion of the second portion, lever, float, and counterbalance through said opening; said rod being offset between its pivot and said first magnetic element to permit said first magnetic element to move axially within said cavity; a second magnetic element supported on said first portion for rotation in response to the movement of said first magnetic element; a calibrated scale; an indicator cooperating with said scale; and means for producing relative movement between said indicator and scale in response to the movement of said second magnetic element.

5. A liquid level guage including: a structure formed to permit a part thereof to extend through an opening in a liquid receptacle, said structure comprising a first portion having a cavity extending inwardly from the lower end thereof and a second portion depending from said lower end; a lever carried by and pivoted near the free end of said second portion; a float attached to one end of said lever; a counterbalance attached to the other end of said lever, said counterbalance recessed so that in certain angular positions of said lever the counterbalance may partially surround said second portion so that said lever, said float, said counterbalance and said second portion may all be inserted through said opening; a first magnetic element mounted for rectilinear movement within said cavity in response to the movement of said float; a second magnetic element supported on said first portion for rotation in response to the movement of said first magnetic element; indicating means carried by said first portion and comprising a calibrated scale and a pointer cooperating with said scale; and means for producing relative movement between said indicator and scale in response to the movement of said second element.

References Cited in the file of this patent

UNITED STATES PATENTS

| Number | Name | Date |
|---|---|---|
| 1,024,377 | Surber | Apr. 23, 1912 |
| 2,300,614 | Connolly | Nov. 3, 1942 |
| 2,634,608 | Sorber | Apr. 14, 1953 |